United States Patent
Paa

(10) Patent No.: US 12,532,903 B2
(45) Date of Patent: Jan. 27, 2026

(54) SUGAR SUBSTITUTE FOR BAKED GOODS OR CONFECTIONERY

(71) Applicant: hello sweety ag, Rotkreuz (CH)

(72) Inventor: Marcel Paa, Sins (CH)

(73) Assignee: hello sweety ag, Rotkreuz (CH)

( * ) Notice: Subject to any disclaimer, the term of this patent is extended or adjusted under 35 U.S.C. 154(b) by 384 days.

(21) Appl. No.: 18/021,103

(22) PCT Filed: Aug. 4, 2021

(86) PCT No.: PCT/IB2021/057149
§ 371 (c)(1),
(2) Date: Feb. 13, 2023

(87) PCT Pub. No.: WO2022/038443
PCT Pub. Date: Feb. 24, 2022

(65) Prior Publication Data
US 2023/0292802 A1 Sep. 21, 2023

(30) Foreign Application Priority Data

Aug. 20, 2020 (CH) ..................... 01041/20

(51) Int. Cl.
| | | |
|---|---|---|
| *A23L 27/30* | (2016.01) | |
| *A21D 2/18* | (2006.01) | |
| *A21D 13/062* | (2017.01) | |
| *A21D 13/50* | (2017.01) | |
| *A23C 13/12* | (2006.01) | |

(52) U.S. Cl.
CPC .............. *A23L 27/34* (2016.08); *A21D 2/181* (2013.01); *A21D 13/062* (2013.01); *A21D 13/50* (2017.01); *A23C 13/12* (2013.01); *A23L 27/36* (2016.08)

(58) Field of Classification Search
CPC ........ A21D 13/062; A21D 2/181; A23L 27/34
See application file for complete search history.

(56) References Cited

U.S. PATENT DOCUMENTS

| | | | |
|---|---|---|---|
| 9,801,403 B2 * | 10/2017 | Krüger | ................... A23L 27/36 |
| 2012/0329884 A1 * | 12/2012 | Markosyan | ............. A23L 27/10 |
| | | | 426/654 |
| 2018/0020707 A1 | 1/2018 | Toksöz | |
| 2021/0244058 A1 | 8/2021 | Galaev | |

FOREIGN PATENT DOCUMENTS

| | | |
|---|---|---|
| DE | 102009046126 A1 | 5/2011 |
| TW | 200901899 A | 1/2009 |
| WO | 2016/120228 A1 | 8/2016 |
| WO | 2020/015816 A1 | 1/2020 |
| WO | 2020/020755 A1 | 1/2020 |

OTHER PUBLICATIONS

International Preliminary Report on Patentability dated Feb. 16, 2023 with Written Opinion for PCT/IB2021/057149, filed Aug. 4, 2021.
International Search Report and Written Opinion for PCT/IB2021/57149, filed Aug. 4, 2021.
Luo Xiao et al., "A review of food reformulation of baked products to reduce added sugar intake" Trends in Food Science and Technology, vol. 86.21 Feb. 2019, pp. 412-425.

* cited by examiner

*Primary Examiner* — Jenna A Watts
(74) *Attorney, Agent, or Firm* — Fleit Intellectual Property Law; Paul D. Bianco; Katharine Davis Wong

(57) ABSTRACT

A sugar substitute for baked goods or pastries, the sugar substitute containing or consisting of (a) 40 to 60 wt % isomaltulose, (b) 20 to 40 wt % erythritol, (c) 8 to 20 wt % inulin, and (d) 0.1 to 1 wt % steviol glycoside relative to the total dry weight of the sugar substitute. A process for manufacturing a sugar substitute as well as to the use of a sugar substitute to replace sucrose in baked goods or pastries and for making baked goods, pastries and baking mixes.

20 Claims, No Drawings

SUGAR SUBSTITUTE FOR BAKED GOODS OR CONFECTIONERY

TECHNICAL FIELD

The invention relates to a sugar substitute for baked goods or confectionery, to a method for the manufacture of the sugar substitute, to the use of the sugar substitute for the manufacture of baked goods, confectionery and baking mixes, as well as to baked goods, confectionery and baking mixes comprising the sugar substitute in accordance with the invention.

BACKGROUND

Sugar substitutes have been known for a long time and are becoming increasingly important because the interest in consuming a reduced amount of sugar in food is increasing among health-conscious consumers. It is therefore the aim of food manufacturers to reduce sugar in foodstuffs or to replace it in its entirety.

In the case of reduced calorie beverages, for a long time, sugar has been replaced by sweeteners. In this regard, a smaller quantity of sweeteners is required in order to obtain the same sweetness as with sugar. The missing bulk can simply be made up with water. However, in the case of baked goods and confectionery, replacement of the volume is not as simple. This is because sugar acts not only to sweeten, but it also binds water, caramelizes upon baking, dissolves in liquid, stabilizes, preserves, influences the texture and consistency of pastries and confectionery, browning, the mouth feel and constitutes a large proportion of the dough. These properties have to be compensated for when exchanging or replacing sugar in baked goods and confectionery.

Sugar is also colloquially known as household sugar, granulated sugar or sucrose and is a disaccharide formed by one molecule of α-D-glucose and one molecule of β-D-fructose.

Currently, nutritive sweeteners or sweeteners are primarily used as sugar substitutes. Nutritive sweeteners are sweet-tasting compounds, usually polyols (what are known as sugar alcohols), which have less influence on the blood sugar level than sugar (sucrose), because they are metabolized independently of insulin. Thus, they are primarily used in foods for diabetics. Sweeteners are synthetically manufactured or natural substitutes for sugar. They have very different chemical structures. Compared with sugar, sweeteners have no or only a low physiological calorific value.

The majority of nutritive sweeteners and sweeteners have a similar or much stronger sweetening power than sugar. While sugar alcohols have enough bulk or enough volume, they often have a negative effect on the textural and taste properties of products. Furthermore, when consumed in large quantities, sugar alcohols have a laxative effect. In contrast, because of their sweetening power, sweeteners do not have enough bulk or enough volume to replace sucrose directly, but are exclusively used to sweeten. As a rule, sweeteners do not have an exclusively sweet taste. Often there is an additional bitter component to the taste. Because of their disadvantageous properties, therefore, the use of nutritive sweeteners and sweeteners in the manufacturer of foodstuffs is limited.

When replacing sugar in baked goods and confectionery, in addition to the sweetness, the missing volume as well as the other baking and processing properties of the sugar, especially as regards the appearance, baked texture/consistency, colour and taste, have to be replaced or compensated for.

Sugar substitutes or sweetener compositions have been described in various patents. As an example, in WO 2020/020755 A1, different sweetener compositions have been described which contain steviol glycoside aggregates and additional sweetening agents and can be added to any food product as a sugar substitute. It is silent as regards the baking properties which are particularly necessary for baking mixes.

WO 2020/015816 A1 discloses a composition for baked goods, in particular a sugar mass substitute, comprising a wet agglomeration particle collective produced from one or more carriers, one or more fats or oils, crystalline or partially crystalline sugar and optionally one or more organoleptically active substances.

WO 2016/120228 A1 describes a natural sweetener composition comprising an apple concentrate, a Luo Han Guo concentrate, as well as other sweeteners in beverages, foodstuffs, pharmaceuticals, oral care products, dietary products or veterinary products.

The known sweeteners suffer from the disadvantage that they either cannot be used as a complete substitute for sugar to be able to reduce the calories sufficiently, or they have a deleterious effect on taste, appearance or consistency in baked goods or confectionery.

SUMMARY OF THE INVENTION

One aspect of the present invention relates to a sugar substitute with which the sugar in baked goods or confectionery can be reduced or replaced, so that baked goods or confectionery can be manufactured with fewer calories than with sugar, and with which at the same time, the properties of sugar relevant to baking and processing, such as the volume formation, baked texture, consistency, colour, taste and appearance, can be maintained in baked goods and confectionery.

In one disclosed embodiment, a sugar substitute for baked goods or confectionery comprises (a) 40-60% by weight of isomaltulose, (b) 20-40% by weight of erythritol, (c) 8-20% by weight of inulin, and (d) 0.1-1% by weight of steviol glycoside, respectively based on the total dry weight of the sugar substitute. Preferably, the sugar substitute consists of (a) 40-60% by weight of isomaltulose, (b) 20-40% by weight of erythritol, (c) 8-20% by weight of inulin, and (d) 0.1-1% by weight of steviol glycoside, respectively based on the total dry weight of the sugar substitute.

These sugar substitutes in accordance with the invention provide baked goods and confectionery with all of the desired properties of conventional sugar (sucrose), such as appearance, smell/fragrance, flavour/taste, texture or consistency as well as processing, with a low calorie count at the same time. Conventional sugar substitutes or sugar substitutes which do not have the proportions in accordance with the invention do not provide sufficient results in baked goods and confectionery.

Preferably, the present invention encompasses a sugar substitute comprising (a) 45-55% by weight of isomaltulose, (b) 30-40% by weight of erythritol, (c) 10-15% by weight of inulin, and (d) 0.1-0.5% by weight of steviol glycoside, based on the total dry weight of the sugar substitute. Particularly preferably, the sugar substitute in accordance with the invention consists of (a) 45-55% by weight of isomaltulose, (b) 30-40% by weight of erythritol, (c) 10-15% by weight of inulin, and (d) 0.1-0.5% by weight of steviol glycoside, based on the total dry weight of the sugar substitute. In these ranges, particularly good baking properties or processing properties are obtained when the sugar substitute is used in baked goods and confectionery.

In addition, the sugar substitute may contain other additives such as at least one flavour or different flavours, for example. Preferably, however, the sugar substitute is used without other additives and consists solely of the ingredients isomaltulose, erythritol, inulin and steviol glycoside in the preferred proportions.

Isomaltulose is a natural sugar and belongs to the disaccharide group. It consists of glucose and fructose, has a neutral taste, caramelizes upon baking, contains almost as many calories as sucrose, but only approximately 60% of the sweetening power of sucrose (sugar). In addition, isomaltulose raises the blood sugar level less quickly, because metabolization is insulin-independent. Isomaltulose is also known by the brand name Palatinose™ and in the mixture in accordance with the invention, it has a stabilizing effect in baked goods and confectionery, so that it can be beaten easily. Thus, a sufficiently large quantity of isomaltulose is important in the sugar substitute in accordance with the invention. Because isomaltulose has a lower melting point and a lower sweetening power than sucrose, isomaltulose alone is not suitable as a sugar substitute in baked goods or confectionery. Isomaltulose differs from isomalt and isomaltose in both its chemical structure and in its properties. Isomalt and isomaltose are not suitable for the manufacture of the sugar substitute in accordance with the invention with the desired properties and therefore do not form part of the subject matter of the present invention.

Erythritol is a sweet-tasting compound and belongs to the sugar alcohols. In the natural form, erythritol can be found in fungi, cheese, fruit (strawberries, plums) or pistachios. Erythritol contains almost no calories and therefore aids in dropping the calorie content of the sugar substitute in accordance with the invention. Erythritol has no influence on the blood sugar level and insulin level and is not a laxative. Furthermore, erythritol contains only approximately 50-70% of the sweetening power of sucrose, does not bind water, has an unpleasant taste in doses which are too high and does not have a caramelizing effect upon baking. Thus, erythritol alone is not suitable as a sugar substitute in baked goods or confectionery.

Inulin is a mixture of polysaccharides formed from fructose building blocks and a terminal glucose residue. It is a fructan. Inulin is a purely plant-based, water-soluble bulking agent which is present in various types of vegetables and plants. Inulin is an indigestible foodstuff which cannot be broken down in significant quantities in the small intestine of the human digestive system. Inulin has a positive effect on gut flora and blood sugar level, but can have a laxative effect in larger quantities and can lead to bloating and diarrhoea. Inulin has only approximately 10% of the sweetening power of sucrose and has a slightly bitter aftertaste. Inulin is therefore not a complete substitute for sucrose. However, inulin binds water and improves the consistency and texture of baked goods or confectionery which are manufactured with the sugar substitute in accordance with the invention, and hence inulin in the correct quantity is an indispensable ingredient of the sugar substitute in accordance with the invention.

Steviol glycoside is obtained from the leaves of the stevia plant and is a natural sweetener. Steviol glycosides include stevioside, rebaudioside, steviol bioside and dulcoside. rebaudioside, particularly preferably rebaudioside A, is preferably used for the sugar substitute in accordance with the invention, because it has a particularly high sweetening power. However, a mixture of different steviol glycosides may also be used. Steviol glycosides have almost no calories and can have up to 450 times the sweetening power of sugar. Thus, in the quantity in accordance with the invention, they are particularly suitable for providing the sugar substitute sufficient with the remaining ingredients with sweetening power together. Because steviol glycosides have a slight aftertaste and do not have a caramelizing effect upon baking, they cannot be used as a complete substitute for sucrose in baked goods or confectionery.

The sugar substitute in accordance with the invention with the ingredients isomaltulose, erythritol, inulin and steviol glycoside in the defined proportions has particularly good baking properties and processing properties. It has the same sweetening power as sucrose but significantly fewer calories, has a caramelizing action, binds water, has a stabilizing action, and has a lower glycemic index than sucrose and therefore a constant energy distribution. In addition, the baked goods or confectionery manufactured with it have an excellent appearance and have the desired colour, the correct flavour/taste and smell, as well as the desired texture and consistency. An additional advantage of the sugar substitute in accordance with the invention is better water binding properties than sucrose. This in particular means that baked goods remain fresher for longer. If the ingredients isomaltulose, erythritol, inulin and steviol glycoside were to be used in smaller or larger quantities than in the quantities defined for the sugar substitute in accordance with the invention, the baking results or processing results in baked goods or confectionery would be unsatisfactory.

Examples of baked goods in accordance with the present invention are bread, biscuits, pastries, in particular cakes, tarts, yeast dough pastries, shortcrust pastries, puff pastries, strudel pastries, cookies, Danish pastries, long-life baked goods and pastries of any type. Examples of confectionery in accordance with the present invention are creams, puddings, fillings, mousses, doughs, batters and sweet rough puff dough. The sugar substitute in accordance with the invention is particularly suitable for baked goods, in particular pastries.

A method for the manufacture of the sugar substitute in accordance with the invention is a further objective of the present invention, wherein the ingredients are optionally granulated and homogeneously mixed. To this end, preferably, the steviol glycoside is initially granulated and then homogeneously mixed with the dry mass of the remaining ingredients so that a composition is formed which is similar to sucrose.

In addition, the present invention concerns the use of a sugar substitute as a substitute for sucrose in baked goods or confectionery, wherein 50% to 100% by weight of the sucrose is replaced by the sugar substitute. Preferably, the sucrose is completely replaced by the sugar substitute. A further objective of the present invention is the use of the sugar substitute for the manufacture of baked goods or confectionery, preferably bread, biscuits, pastries, in particular cakes, tarts, yeast dough pastries, shortcrust pastries, puff pastries, strudel pastries, cookies and long-life baked goods, as well as creams and fillings for baked goods or confectionery, or for the manufacture of baking mixes.

The sugar substitute in accordance with the invention is particularly suitable for the manufacture of baked goods. The particular properties of the sugar substitute, such as binding water, caramelization upon baking, dissolving in liquids, stabilizing action, preservative action and the desired influence on texture and consistency, come to the fore in the case of pastries and confectionery in particular.

Another aspect of the invention is constituted by baked goods or confectionery and baking mixes comprising the sugar substitute in accordance with the invention, wherein the baked goods or confectionery are selected from the group comprising or consisting of bread, biscuits, pastries, in particular cakes, tarts, yeast dough pastries, shortcrust pastries, puff pastries, strudel pastries, cookies, long-life baked goods, creams and fillings for baked goods or confectionery.

EXEMPLARY EMBODIMENTS OF THE INVENTION

The present invention will now be described in more detail with the aid of exemplary embodiments which, however, do not limit the scope of the subject matter of the invention.

Different proportions of the sugar substitute as well as comparative sweeteners were used in different baked goods and confectionery and a quality test was carried out on them. In this regard, the equipment, oven and room temperatures, baking times as well as the remaining ingredients of the baked goods or confectionery were kept the same. In order to assess the quality, the following test criteria were investigated and the following weighting was assigned to the assessments: appearance (weighting of 10%), smell/fragrance (weighting of 30%), flavour/taste (weighting of 35%), texture/consistency (weighting of 25%). In this regard, scores were given for the various criteria, applied in accordance with the following key:

| | |
|---|---|
| 5.5-6 | Very good |
| 4.8-5.4 | Good |
| 4-4.7 | Sufficient |
| 2.5-3.9 | Insufficient |
| 1-2.5 | Poor |

The aim was for the baked goods and confectionery using the sugar substitute in accordance with the invention to come as close as possible, in respect of the test criteria, to the original baked goods and confectionery using commercial sugar (sucrose) without having to make compromises as regards the texture and the taste.

In the examples below, a sugar substitute was used in accordance with the invention with 50% by weight of isomaltulose, 37.5% by weight of erythritol, 12% by weight of inulin and 0.5% by weight of rebaudioside A and compared with sucrose, erythritol and a comparative sugar substitute with 38% by weight of isomaltulose, 47% by weight of erythritol, 14.5% by weight of inulin and 0.5% by weight of rebaudioside A. Further comparative sugar substitutes with proportions outside the proportions in accordance with the invention were also analysed in order to ascertain the preferred range for each of the ingredients. However, this is not given in detail here. As an example, unsatisfactory results were obtained with a comparative sugar substitute with 38% by weight of isomaltulose, 57% by weight of erythritol, 4.5% by weight of inulin and 0.5% by weight of rebaudioside A.

Example 1—Biscuits

For the manufacture of biscuits, 6 eggs, 210 g of sugar and 210 g of wheat flour were mixed and baked. In each case, the same quantity (dry weight) was used of a sugar substitute in accordance with the invention (invention), sucrose, a conventional sweetener (erythritol), as well as a sugar substitute which was outside the proportions in accordance with the invention (comparison).

1.1 Biscuits with the Sugar Substitute in Accordance with the Invention (Invention: 50% by Weight of Isomaltulose, 37.5% by Weight of Erythritol, 12% by Weight of Inulin and 0.5% by Weight of Rebaudioside A):

The biscuit dough with the sugar substitute in accordance with the invention was very easy to process prior to baking, the sugar crystals dissolved without problems. After baking, the biscuits had a colour which was typical of its type, which looked a little darker than with household sugar. The baking time could be reduced somewhat (appearance score: 5). The biscuits had a pleasant, typical smell/fragrance (score: 6), a sweet, balanced aromatic taste/flavour (score: 6) as well as a soft, airy and moist structure which was typical of its type. The volume was identical to when sucrose was used (texture/consistency score: 6). Overall assessment with sugar substitute in accordance with the invention: score 5.9, very good.

1.2 Biscuits with Conventional Sugar (Sucrose):

The biscuit dough with conventional sugar was very easy to process prior to baking, the sugar crystals dissolved without problems. After baking, the biscuits had a colour which was typical of its type. Appearance score: 6. The biscuits had a pleasant, typical smell/fragrance (score: 6), a sweet, balanced aromatic taste/flavour (score: 6) as well as a soft, airy and moist structure which was typical of its type with excellent volume (texture/consistency score: 6). Overall assessment with sucrose: score 6, very good.

1.3 Biscuits with Conventional Sweetener (100% Erythritol):

The biscuit dough with erythritol was viscous before baking and was not easy to process. The sugar crystals did not dissolve well. After baking, the biscuits had a colour which was typical of its type, which looked a little darker than with household sugar. Appearance score: 4. The biscuits had a slightly synthetic, odd smell/fragrance (score: 4), a synthetic, cooling and odd aftertaste/flavour (score: 4) as well as a rather compact structure, less volume, as well as a dry and crumbly consistency (texture/consistency score: 4). Overall assessment with erythritol: 4 score, sufficient.

1.4 Biscuits with Sugar Substitute Outside the Proportions in Accordance with the Invention (Comparison: 38% by Weight of Isomaltulose, 47% by Weight of Erythritol, 14.5% by Weight of Inulin and 0.5% by Weight of Rebaudioside A):

The biscuit dough with a sugar substitute which was outside the proportions in accordance with the invention was not easy to process prior to baking. The sugar crystals did not dissolve well. Appearance score: 4. The biscuits had a slightly synthetic, odd smell/fragrance (score: 4), a synthetic, cooling and odd aftertaste/flavour (score: 4) as well as a rather compact structure, less volume, as well as a dry and crumbly consistency (texture/consistency score: 4). Overall assessment with comparative sugar substitute: score 4, sufficient.

TABLE 1

Results for biscuits

|  | Invention | Sucrose | Erythritol | Comparative |
|---|---|---|---|---|
| Appearance | 5 | 6 | 4 | 4 |
| Smell/fragrance | 6 | 6 | 4 | 4 |
| Flavour/taste | 6 | 6 | 4 | 4 |
| Texture/consistency | 6 | 6 | 4 | 4 |
| Overall assessment | 5.9-very good | 6-very good | 4-sufficient | 4-sufficient |

Excellent biscuits could be manufactured with the sugar substitute in accordance with the invention which completely corresponded to a product with conventional sugar and at the same time had far fewer calories. In contrast, the results obtained with erythritol or with a comparative sugar substitute were in fact sufficient, but not satisfactory.

Example 2—Butter Shortbread Biscuits

In order to manufacture a butter shortbread biscuit, 100 g of butter, 1 vanilla pod, 70 g of (icing) sugar, 1 egg and 150 g of wheat flour were mixed, piped onto a baking sheet using an icing bag and baked. In each case, the same quantity (dry weight) was used of a sugar substitute in accordance with the invention (invention), sucrose in the form of icing sugar, a conventional sweetener (erythritol), as well as a sugar substitute which was outside the proportions in accordance with the invention (comparison).

2.1 Butter Shortbread Biscuits with the Sugar Substitute in Accordance with the Invention (Invention: 50% by Weight of Isomaltulose, 37.5% by Weight of Erythritol, 12% by Weight of Inulin and 0.5% by Weight of Rebaudioside A):

The butter dough with the sugar substitute in accordance with the invention was very easy to process prior to baking, the sugar crystals dissolved without problems, and the dough had a good consistency for piping the butter dough. After baking, the butter shortbread biscuits had a colour which was typical of its type (appearance score: 6). The butter shortbread biscuits had a pleasant, typical smell/fragrance (score: 6), a sweet, balanced aromatic taste/flavour (score: 6) as well as an externally crisp, internally soft and moist consistency which was typical of its type (texture/consistency score: 6).

Overall assessment with the sugar substitute in accordance with the invention: score 6, very good.

2.2 Butter Shortbread Biscuits with Sucrose:

The butter dough with sucrose was very easy to process prior to baking, the sugar crystals dissolved without problems, and the dough had a good consistency for piping the butter dough. After baking, the butter shortbread biscuits had a colour which was typical of its type. Appearance score: 6. The butter shortbread biscuits had a pleasant, typical smell/fragrance (score: 6), a sweet, balanced aromatic taste/flavour (score: 6) as well as an externally crisp, internally soft and moist consistency which was typical of its type (texture/consistency score: 6).

Overall assessment with sucrose: score 6, very good.

2.3 Butter Shortbread Biscuits with Conventional Sweetener (100% Erythritol):

The butter dough with erythritol was viscous prior to baking, very dark and was not easy to process. The sugar crystals did not dissolve well. The dough was almost too stiff to pipe. Appearance score: 3. The butter shortbread biscuits had a slightly synthetic, odd smell/fragrance (score: 3), a synthetic and odd taste/flavour (score: 3) as well as a somewhat hard, rather than crisp, and internally dry consistency (texture/consistency score: 2).

Overall assessment with erythritol: score 2.8, unsatisfactory.

2.4 Butter Shortbread Biscuits with Sugar Substitute Outside the Proportions in Accordance with the Invention (Comparison: 38% by Weight of Isomaltulose, 47% by Weight of Erythritol, 14.5% by Weight of Inulin and 0.5% by Weight of Rebaudioside A):

The butter dough with the comparative sugar substitute was viscous prior to baking, very dark and was not easy to process. The sugar crystals did not dissolve well. The dough was almost too stiff to pipe. Appearance score: 3. The butter shortbread biscuits had a slightly synthetic, odd smell/fragrance (score: 3), a synthetic and odd taste/flavour (score: 3) as well as a somewhat hard, rather than crisp, and internally dry consistency (texture/consistency score: 2).

Overall assessment with comparative sugar substitute: score 2.8, unsatisfactory.

TABLE 2

Results for butter shortbread biscuits

|  | Invention | Sucrose | Erythritol | Comparative |
|---|---|---|---|---|
| Appearance | 6 | 6 | 3 | 3 |
| Smell/fragrance | 6 | 6 | 3 | 3 |
| Flavour/taste | 6 | 6 | 3 | 3 |
| Texture/consistency | 6 | 6 | 2 | 2 |
| Overall assessment | 6-very good | 6-very good | 2.8-insufficient | 2.8-insufficient |

Excellent butter shortbread biscuits could be manufactured with the sugar substitute in accordance with the invention, fully corresponding to a product with conventional sugar and at the same time having far fewer calories. In contrast, unsatisfactory results were obtained with erythritol or with a comparative sugar substitute.

Example 3—Meringues

In order to manufacture meringues, 2 egg whites and 120 g of sugar were beaten, piped onto a baking sheet with a piping bag and baked. In each case, the same quantity (dry weight) was used of a sugar substitute in accordance with the invention (invention), sucrose, a conventional sweetener (erythritol), as well as a sugar substitute which was outside the proportions in accordance with the invention (comparison).

3.1 Meringues with the Sugar Substitute in Accordance with the Invention (Invention: 50% by Weight of Isomaltulose, 37.5% by Weight of Erythritol, 12% by Weight of Inulin and 0.5% by Weight of Rebaudioside A):

The meringue mixture with the sugar substitute in accordance with the invention was very easy to process prior to baking, the sugar crystals dissolved, and the mass had a good colour and shape (appearance score: 6). The meringues had a pleasant, fresh, balanced sweet smell/fragrance (score: 6), a sweet, balanced aromatic taste/flavour (score: 6) as well as a soft, externally crisp and internally slightly liquid consistency which was typical of its type (texture/consistency score: 6).

Overall assessment with the sugar substitute in accordance with the invention: score 6, very good.

3.2 Meringues with Sucrose:

The meringue mixture with sucrose was very easy to process prior to baking, the sugar crystals dissolved, and the mixture had a good colour and shape. Appearance score: 6. The meringues had a pleasant, fresh, balanced sweet smell/fragrance (score: 6), a sweet, balanced aromatic taste/flavour (score: 6) as well as a soft, externally crisp and internally slightly liquid consistency which was typical of its type (texture/consistency score: 6). Overall assessment with sucrose: score 6, very good.

3.3 Meringues with Conventional Sweetener (100% Erythritol):

The meringue mixture with erythritol spread prior to baking and looked very unappetising. The mass was not easy to pipe. Appearance score: 1. The meringues had a peculiar, odd smell/fragrance (score: 3), a slightly burnt taste/flavour (score: 3.5) as well as a soft and rubbery consistency (texture/consistency score: 2). Overall assessment with erythritol: score 2.7, unsatisfactory.

3.4 Meringues with Sugar Substitute Outside the Proportions in Accordance with the Invention (Comparison: 38% by Weight of Isomaltulose, 47% by Weight of Erythritol, 14.5% by Weight of Inulin and 0.5% by Weight of Rebaudioside A):

The meringue mixture with the comparative sugar substitute spread prior to baking and looked rather unappetising. The mass was not easy to pipe. Appearance score: 1. The meringues had a peculiar, odd smell/fragrance (score: 3), a slightly burnt taste/flavour (score: 3.5) as well as a soft and rubbery consistency (texture/consistency score: 2).

Overall assessment with comparative sugar substitute: score 2.7, unsatisfactory.

TABLE 3

Results for meringues

| | Invention | Sucrose | Erythritol | Comparative |
|---|---|---|---|---|
| Appearance | 6 | 6 | 1 | 1 |
| Smell/fragrance | 6 | 6 | 3 | 3 |
| Flavour/taste | 6 | 6 | 3.5 | 3.5 |
| Texture/consistency | 6 | 6 | 2 | 2 |
| Overall assessment | 6-very good | 6-very good | 2.7-insufficient | 2.7-insufficient |

Excellent meringues could be manufactured with the sugar substitute in accordance with the invention, fully corresponding to a product with conventional sugar and at the same time having far fewer calories. In contrast, unsatisfactory results were obtained with erythritol or with a comparative sugar substitute.

Example 4—Sweet Buns

In order to manufacture a sweet yeast dough, 250 g of milk, 50 g of sugar, 35 g of yeast, 1 egg, 1 vanilla pod, 500 g of flour, 70 g of butter and 10 g of salt were mixed and baked. In each case, the same quantity (dry weight) was used of a sugar substitute in accordance with the invention (invention), sucrose, a conventional sweetener (erythritol), as well as a sugar substitute which was outside the proportions in accordance with the invention (comparison).

4.1 Sweet Buns with the Sugar Substitute in Accordance with the Invention (Invention: 50% by Weight of Isomaltulose, 37.5% by Weight of Erythritol, 12% by Weight of Inulin and 0.5% by Weight of Rebaudioside A):

The sweet yeast dough with the sugar substitute in accordance with the invention was very easy to process prior to baking, The dough had the properties of a typical yeast dough. After baking, the buns had a colour and shape which was typical of their type, they rose well, the volume was pronounced, the dough appeared to have fed the yeast well (slightly better than with sucrose) (appearance score: 6). The buns had a pleasant smell/fragrance which was typical of their type (score: 6), a sweet, balanced aromatic taste/flavour (score: 6) as well as a soft and airy texture which was typical of their type, with good volume (texture/consistency score: 6).

Overall assessment with the sugar substitute in accordance with the invention: score 6, very good.

4.2 Sweet Buns with Conventional Sugar (Sucrose):

The yeast dough with conventional sugar was very easy to process prior to baking; the dough had the properties of a typical yeast dough. After baking, the buns had a colour which was typical of their type, rising and volume were somewhat less than with the sugar substitute in accordance with the invention. Appearance score: 5,5. The buns had a pleasant, typical smell/fragrance (score: 6), a sweet, balanced aromatic taste/flavour (score: 6) as well as a soft and airy texture which was typical of their type (texture/consistency score: 6). Overall assessment with sucrose: score 6, very good.

4.3 Sweet Buns with Conventional Sweetener (100% Erythritol):

The yeast dough with erythritol produced a smooth dough prior to baking. The sugar crystals did not dissolve well and it did not rise well. After baking, the sweet buns had not risen well and therefore the volume was poor. No sugar was available to feed the yeast. Appearance score: 2. The buns had a slightly synthetic, odd smell/fragrance (score: 5), a synthetic, cooling and odd aftertaste/flavour (score: 4) as well as a rather tough structure and compact volume (texture/consistency score: 3). Overall assessment with erythritol: score 3,9, unsatisfactory.

4.4 Sweet Buns with Sugar Substitute Outside the Proportions in Accordance with the Invention (Comparison: 38% by Weight of Isomaltulose, 47% by Weight of Erythritol, 14.5% by Weight of Inulin and 0.5% by Weight of Rebaudioside A):

The yeast dough with a comparative sugar substitute did not provide a smooth dough prior to baking. The sugar crystals did not dissolve well and it did not rise well. After baking, the sweet buns had not risen well and therefore the volume was poor. No sugar was available to feed the yeast. Appearance score: 2. The buns had a slightly synthetic, odd smell/fragrance (score: 5), a synthetic, cooling and odd aftertaste/flavour (score: 4) as well as a rather stiff structure and compact volume (texture/consistency score: 3).

Overall assessment with comparative sugar substitute: score 3.9, unsatisfactory.

TABLE 4

Results for sweet buns

| | Invention | Sucrose | Erythritol | Comparative |
|---|---|---|---|---|
| Appearance | 6 | 5.5 | 2 | 2 |
| Smell/fragrance | 6 | 6 | 5 | 5 |
| Flavour/taste | 6 | 6 | 4 | 4 |
| Texture/consistency | 6 | 6 | 3 | 3 |
| Overall assessment | 6-very good | 6-very good | 3.9-insufficient | 3.9-insufficient |

Excellent sweet buns could be manufactured with the sugar substitute in accordance with the invention, which fully corresponding to a product with conventional sugar and at the same time having far fewer calories. In contrast, no satisfactory results were obtained with erythritol or with a comparative sugar substitute.

Example 5—Vanilla Cream

In order to manufacture a vanilla cream for a cream or for a filling for pastries, 300 g of milk, 50 g of sugar, 1 egg yolk, 30 g of corn starch were mixed, brought to the boil and stirred until a creamy mixture was formed. In each case, the same quantity (dry weight) was used of a sugar substitute in accordance with the invention (invention), sucrose, a conventional sweetener (erythritol), as well as a sugar substitute which was outside the proportions in accordance with the invention (comparison).

5.1 Vanilla Cream with the Sugar Substitute in Accordance with the Invention (Invention: 50% by Weight of Isomaltulose, 37.5% by Weight of Erythritol, 12% by Weight of Inulin and 0.5% by Weight of Rebaudioside A):

The vanilla cream with the sugar substitute in accordance with the invention was easy to process and had a good colour and shape which was typical of its type (appearance score: 6). The vanilla cream had a pleasant, typical smell/fragrance (score: 6), a sweet, balanced aromatic taste/flavour (score: 6) as well as a soft and airy texture which was typical of its type, which was identical to the original with sucrose (texture/consistency score: 6).

Overall assessment with the sugar substitute in accordance with the invention: score 6, very good.

5.2 Vanilla Cream with Sucrose:

The vanilla cream with the sugar substitute in accordance with the invention was easy to process and had an excellent colour and shape which was typical of its type. Appearance score: 6. The vanilla cream had a pleasant, typical smell/fragrance (score: 6), a sweet, balanced aromatic taste/flavour (score: 6) as well as a soft and airy texture which was typical of its type (texture/consistency score: 6). Overall assessment with sucrose: score 6, very good.

5.3 Vanilla Cream with Conventional Sweetener (100% Erythritol):

The vanilla cream with erythritol could not be homogenized, the mixture took up some water and was slightly granular. Appearance score: 3. The vanilla cream had a slightly synthetic, odd smell/fragrance (score: 3), a synthetic, odd, cooling taste/flavour (score: 3) as well as a granular texture, which could not be homogenized (texture/consistency score: 2).

Overall assessment with erythritol: score 2.8, unsatisfactory.

5.4 Vanilla Cream with Sugar Substitute Outside the Proportions in Accordance with the Invention (Comparison: 38% by Weight of Isomaltulose, 47% by Weight of Erythritol, 14.5% by Weight of Inulin and 0.5% by Weight of Rebaudioside A):

The vanilla cream with the comparative sugar substitute could not be homogenized, the mixture took up some water and was slightly granular. Appearance score: 3. The vanilla cream had a slightly synthetic, odd smell/fragrance (score: 3), a synthetic, odd, cooling taste/flavour (score: 3) as well as a granular texture, which could not be homogenized (texture/consistency score: 2). Overall assessment with comparative sugar substitute: score 2.8, unsatisfactory.

TABLE 5

Results for vanilla cream

| | Invention | Sucrose | Erythritol | Comparative |
|---|---|---|---|---|
| Appearance | 6 | 6 | 3 | 3 |
| Smell/fragrance | 6 | 6 | 3 | 3 |
| Flavour/taste | 6 | 6 | 3 | 3 |
| Texture/consistency | 6 | 6 | 2 | 2 |
| Overall assessment | 6-very good | 6-very good | 2.8-insufficient | 2.8-insufficient |

With the sugar substitute in accordance with the invention, a vanilla cream could be manufactured which fully corresponded to a product with conventional sugar and at the same time had far fewer calories. In contrast, unsatisfactory results were obtained with erythritol or with a comparative sugar substitute.

The invention claimed is:

1. A sugar substitute for baked goods and confectioneries, the sugar substitute comprising ingredients of:
   (a) 40-60% by weight of isomaltulose,
   (b) 20-40% by weight of erythritol,
   (c) 8-20% by weight of inulin, and
   (d) 0.1-1% by weight of a steviol glycoside,
   based on total dry weight of the sugar substitute.

2. The sugar substitute according to claim 1, comprising the ingredients of:
   a) 45-55% by weight of isomaltulose,
   (b) 30-40% by weight of erythritol,
   (c) 10-15% by weight of inulin, and
   (d) 0.1-0.5% by weight of a steviol glycoside,
   based on the total dry weight of the sugar substitute.

3. The sugar substitute according to claim 1, wherein the steviol glycoside is rebaudioside A.

4. The sugar substitute according to claim 1, further comprising at least one flavoring.

5. A method for manufacture of the sugar substitute according to claim 1, the method comprising:
   granulating the ingredients to form granulated ingredients; and
   homogeneously mixing the granulated ingredients together to manufacture the sugar substitute.

6. Baked goods or confectioneries comprising the sugar substitute according to claim 1.

7. A baking mix or a confectionary mix comprising the sugar substitute according to claim 1.

8. Baked goods or confectioneries, wherein at least 50% by weight of sucrose in the baked goods or the confectioneries has been replaced by the sugar substitute according to claim 1.

9. The baked goods or confectioneries according to claim 8, wherein 100% by weight of the sucrose in the baked goods or confectioneries has been replaced by the sugar substitute.

10. The baked goods or confectioneries according to claim 8, wherein the baked goods or confectioneries are at least one of breads, biscuits, pastries, cakes, tarts, cookies, long-life baked goods, creams for confectioneries, and fillings for confectioneries.

11. The baked goods or confectioneries according to claim 10, wherein the pastries are at least one of yeast dough pastries, shortcrust pastries, puff pastries, and strudel pastries.

12. The baked goods or confectioneries according to claim 6, wherein the baked goods or confectioneries are at least one of breads, biscuits, pastries, cakes, tarts, cookies, long-life baked goods, creams for confectioneries, and fillings for confectioneries.

13. The baked goods or confectioneries according to claim 12, wherein the pastries are at least one of yeast dough pastries, shortcrust pastries, puff pastries, and strudel pastries.

14. The sugar substitute according to claim 2, wherein the steviol glycoside is rebaudioside A.

15. The sugar substitute according to claim 14, comprising the ingredients of:
   a) 50% by weight of isomaltulose,
   (b) 37.5% by weight of erythritol,
   (c) 12% by weight of inulin, and
   (d) 0.5% by weight of rebaudioside A,
   based on the total dry weight of the sugar substitute.

16. A sugar substitute in baked goods and confectioneries, the sugar substitute consisting of:
   a) 45-55% by weight of isomaltulose,
   (b) 30-40% by weight of erythritol,
   (c) 10-15% by weight of inulin, and
   (d) 0.1-0.5% by weight of a steviol glycoside,
   based on total dry weight of the sugar substitute.

17. The sugar substitute according to claim 16, wherein the steviol glycoside is rebaudioside A.

18. Baked goods or confectioneries comprising the sugar substitute according to claim 16.

19. A baking mix or a confectionary mix comprising the sugar substitute according to claim 16.

20. Baked goods or confectioneries, wherein at least 50% and up to 100% by weight of sucrose in the baked goods or the confectioneries has been replaced by the sugar substitute according to claim 16.

* * * * *